Oct. 20, 1964 S. J. BIELLO ETAL 3,153,423

TWO WAY CHECK VALVE

Filed May 16, 1962

INVENTOR.
STEPHEN J. BIELLO
HERMAN LINDEBOOM
BY
William Frederick Werner
ATTORNEY United States Patent Office 3,153,423
Patented Oct. 20, 1964

3,153,423
TWO WAY CHECK VALVE
Stephen J. Biello, Somerset, Mass., and Herman Lindeboom, Warwick, R.I., assignors to Sealol, Inc., Warwick, R.I., a corporation of Delaware
Filed May 16, 1962, Ser. No. 195,190
1 Claim. (Cl. 137—493.5)

This invention relates to check valves and more particularly to a check valve which will relieve pressure in opposite directions.

An object of the present invention is to provide a check valve which will relieve pressure within a container when the pressure exceeds a preselected amount within the container and to allow the pressure within a container to increase when the pressure within the container falls below a preselected amount.

Another object of the present invention is to fabricate a piston out of resilient material so that the piston will soft seat on hard material and provide a soft seat for a hard material piston.

Still another object of the present invention is to provide a two way check valve which is extremely inexpensive to manufacture by eliminating the normal and usual machine and fitting operations and yet be reliable in function and fool proof in operation.

And still another object of the present invention is to provide a two way check valve with two axially aligned pistons which seat and unseat in opposite directions to one another.

Other objects of the present invention will become apparent in part and be pointed out in part in the following specification and claim.

In the past check valves maintained the pressure within a container or hydraulic system and relieved excess pressure from the system. The check valve could not allow pressure to reenter the system. The manufacturing difficulties, inherent in providing two pistons, in a single housing operating in opposite directions which would accurately increase or decrease pressure within a system, were great and costly.

The present two way check valve overcomes all past difficulties while providing a check valve which will maintain with absolute accuracy pressure within a hydraulic system.

Referring to the drawings in which similar characters of reference indicate corresponding parts in all the figures.

Figure 1:
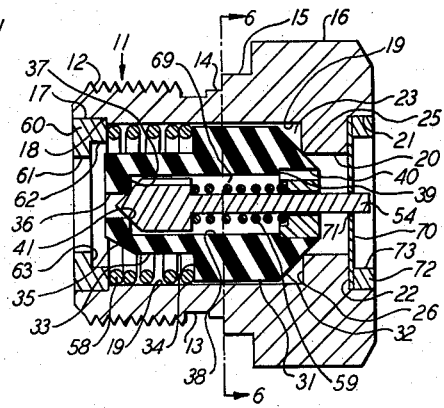
FIGURE 1 is a medial longitudinal cross sectional view through the new and improved two way check valve, showing both pistons seated.
Figure 2:
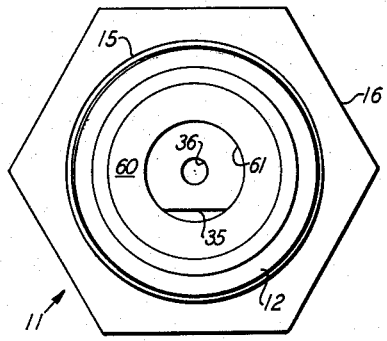
FIGURE 2 is a left hand end view of FIGURE 1.

In proceeding with this invention there is provided a housing, generally indicated by reference numeral 11, consisting externally of a threaded area 12 terminating in a circular recess 13 adjacent a first circular step 14 and a second circular step 15 and provided with an hexagonal shaped head 16.

Axially, housing 11 is provided with a stepped bore forming a fluid passageway therethrough and consisting of a circular recess 17, a shoulder 18, a chamber wall 19, a port 20 and an annular recess 21 having a circular wall 22. Chamber wall 19 forms a chamber 23. A round flange 26 is formed between chamber wall 19 and port 20. A valve seat 25 is formed at the intersection of round flange 26 and port 20.

The novelty of the present invention resides in a piston being constructed as both a piston and a valve seat for another piston and is generally indicated by reference numeral 30. Piston 30 is preferably fabricated from resilient material such as neoprene. However, metal may be used. The specification will be directed to the nomenclature, resilient material, for convenience.

Combined piston and valve seat structure 30, is provided externally with a body portion 31, a beveled face 32, and a reduced area 33, a wall 34 and a chamfer 35. Body portion 31 may have any geometric shape which permits fluid to pass between body portion 31 and chamber wall 19. It is illustrated as square.

Axially, combined piston and valve seat structure 30 is provided with a stepped bore forming a fluid passageway therethrough consisting of a port 36, a wall 37, a cavity wall 38, a rim 39, a counterbore 40 and a valve seat 41 at the intersection of wall 37 and port 36.

A (second) piston, generally indicated by reference numeral 50, is provided with a head 51 having a plurality of longitudinal passageways 52, a valve face 53, and a shank 54.

A bushing 55 is provided with a bore 56 and longitudinal grooves 57.

The new and improved two way check valve is assembled and operates as follows: Combined piston and valve seat structure 30 is placed in chamber 23 with beveled face 32 lying against valve seat 25. It will be observed that when valve face 32 consists of resilient material, a perfect fluid tight seal is accomplished without the necessity of accurate and expensive machining between the beveled face 32 and the sharp edge construction of valve seat 25. A fluid tight valve is provided even though the mating surfaces are rough. A condition fatal to total metal construction.

A coil spring 58 is placed over reduced area 33 and against wall 34. A retaining ring 60 provided with an annular opening 61, a circular depression 62 having a piston engaging surface 63 is located and secured in circular recess 17 by means of a drive fit.

Combined piston and valve seat structure 30 is slidably mounted in chamber 33 with coil spring 58 yieldingly holding beveled face 32 against valve seat 25. Square body portion 31 forms fluid passageways 65, 66, 67, 68 in cooperation with chamber wall 19.

Piston 50 is slidably mounted in cavity wall 38 with valve face 53 engaging valve seat 41. The resilient nature of valve seat 41 assures a fluid tight engagement with valve seat 53 which is preferably fabricated from metal such as aluminum. A coil spring 59 is placed over shank 54 and against head 51. Bushing 55 is slid over shank 54 against rim 39 and into engagement with counterbore 40. Counterbore 40 being part of resilient member 30 removably holds bushing 55 in position. Coil spring 59 abuts bushing 55 to yieldingly force valve face 53 into fluid tight engagement with valve seat 41. Fluid entering port 20 travels through longitudinal grooves 57, cavity 69, and longitudinal passageways 52 to either pass through port 36 or be prevented from passing through port 36 by engagement of valve face 53 with valve seat 41.

A screen 70 provided with an axial bore 71 is slid over shank 54 and into annular recess 21. A collar 72 having an axial opening 73 is secured in annular recess 21 by means of a drive fit. Collar 72 holds screen 70 in position.

FIGURE 1 illustrates both combined piston and valve seat structure 30 and piston 50 in closed valve position.

Figure 3:
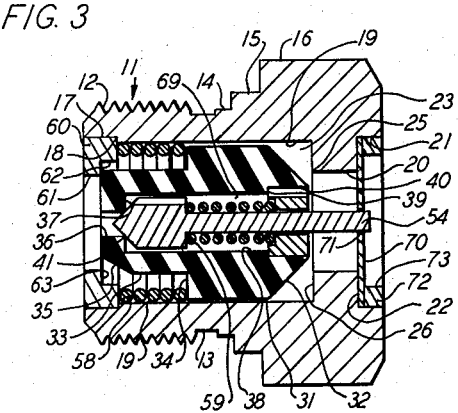
FIGURE 3 is a view similar to FIGURE 1 showing one piston unseated and the other piston seated.

FIGURE 3 illustrates fluid under pressure greater than the torque of coil spring 58 acting on beveled face 32 to slide combined piston and valve seat structure 30 into engagement with piston engaging surface 63 whereby fluid may flow through chamber 23 and through annular opening 61. Chamfer 35 prevents the end of combined piston and valve seat structure 30 from engaging piston engaging surface 63 in a manner to block the flow of fluid through annular opening 61. In other words chamfer 35 provides an opening between chamber 23 and annular opening 61 when the end of combined piston and valve seat structure 30 abuts piston engaging surface 63.

It will be noted that combined piston and valve seat structure 30 carries (second) piston 50 in moving toward and away from the engagement of beveled face 32 with valve seat 25 and that piston 50 is operationally unaffected by such movement.

Figure 4:
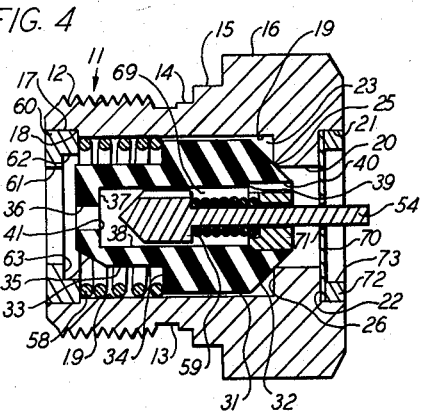
FIGURE 4 is a view similar to FIGURE 3 showing the pistons in opposite operating position to the operating positions shown in FIGURE 3.
Figure 5:
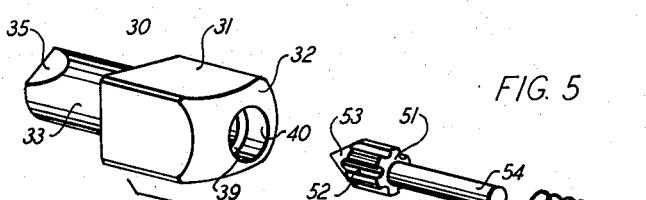
FIGURE 5 is an exploded perspective view of the two pistons.
Figure 6:
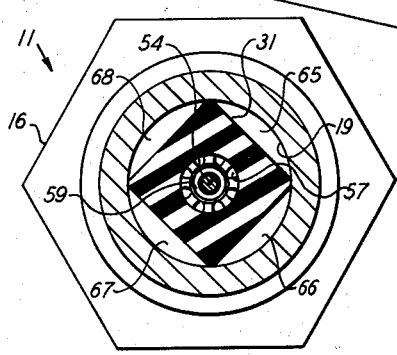
FIGURE 6 is a vertical cross sectional view taken along line 6—6 of FIGURE 1.

FIGURE 4 illustrates fluid under pressure greater than the torque of coil spring 59 acting on valve face 53 to slide piston 50 out of fluid sealing position of valve face 53 engaging valve seat 41. Fluid may pass through annular opening 61, circular depression 62, port 36, chamber 69, longitudinal passageways 52, longitudinal grooves 57, port 20, screen 70 and axial opening 73. Beveled face 32 engaging valve seat 25 provides a fluid tight seal therebetween to prevent fluid from flowing through chamber 23.

Having shown and described a preferred embodiment of the present invention by way of example, it should be realized that structural changes could be made and other examples given without departing from either the spirit or scope of this invention.

What I claim is:

A two way check valve consisting of a housing provided externally with a threaded area and a hexagonal shaped head, said housing having a chamber, a radial wall at one end of said chamber providing a valve seat; a combined piston and valve seat structure fabricated from resilient material and provided externally with a square body portion, said structure being disposed slidably within said chamber, said structure having a beveled face at one end thereof, the opposite end of said structure having a chamfer therein, the outer portion of said structure having a step therein to form a wall, said structure being bored through to provide an axial cavity having a cavity wall, one end of said cavity being a port, the opposite end of said cavity being formed as a counterbore, said counterbore being of larger diameter than said cavity to define a rim between said cavity and said disk; a piston disposed slidably within said cavity, said piston having a piston head provided with a plurality of longitudinal passageways, one end of said piston being formed as a valve face, the opposing end of said piston being a shank; a bushing removably engaged in said counterbore for containing said piston in said cavity, said bushing having a plurality of longitudinal passageways therein, said bushing having central bore therethrough to receive the shank of said piston, a coil spring located on said piston shank between said piston head and said bushing to urge said piston valve face into engagement with said structure port; a retaining ring affixed in a circular depression formed at the end of said housing remote from the valve seat therein, said retaining ring having a piston engaging face; a second spring positioned between said structure wall and said retaining ring to bias said structure bevel face against said housing valve seat, whereby fluid flowing in one direction at a given pressure overcomes said first mentioned spring to move said piston against the torque of said spring and fluid flowing in the opposite direction at the same pressure moves said resilient member against the torque of said second spring, said chamfer providing a fluid passageway between the end of said structure and said retaining ring.

References Cited in the file of this patent

UNITED STATES PATENTS

| 1,107,383 | Udstad | Aug. 18, 1914 |
| 1,705,293 | Horthy et al. | Mar. 12, 1929 |
| 2,247,520 | Paxton | July 1, 1941 |
| 2,771,093 | Wilson | Nov. 20, 1956 |
| 3,061,138 | Edelmann et al. | Oct. 30, 1962 |

FOREIGN PATENTS

| 153,513 | Great Britain | Nov. 11, 1920 |